Oct. 4, 1966  V. T. CALFEE  3,276,495
APPARATUS FOR SHELLING PECANS
Filed July 30, 1959  3 Sheets-Sheet 1
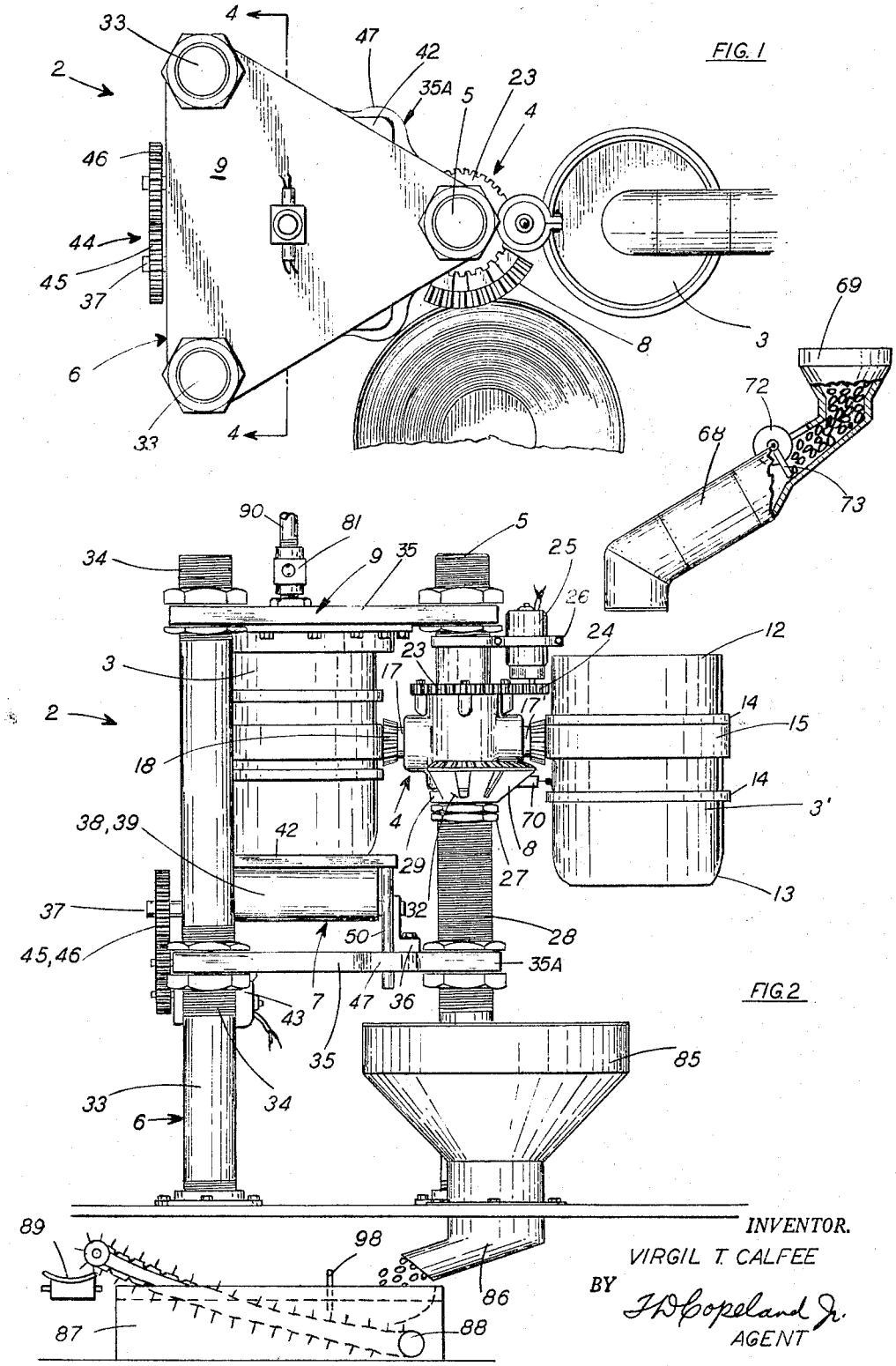
INVENTOR.
VIRGIL T. CALFEE
BY
T. D. Copeland Jr.
AGENT

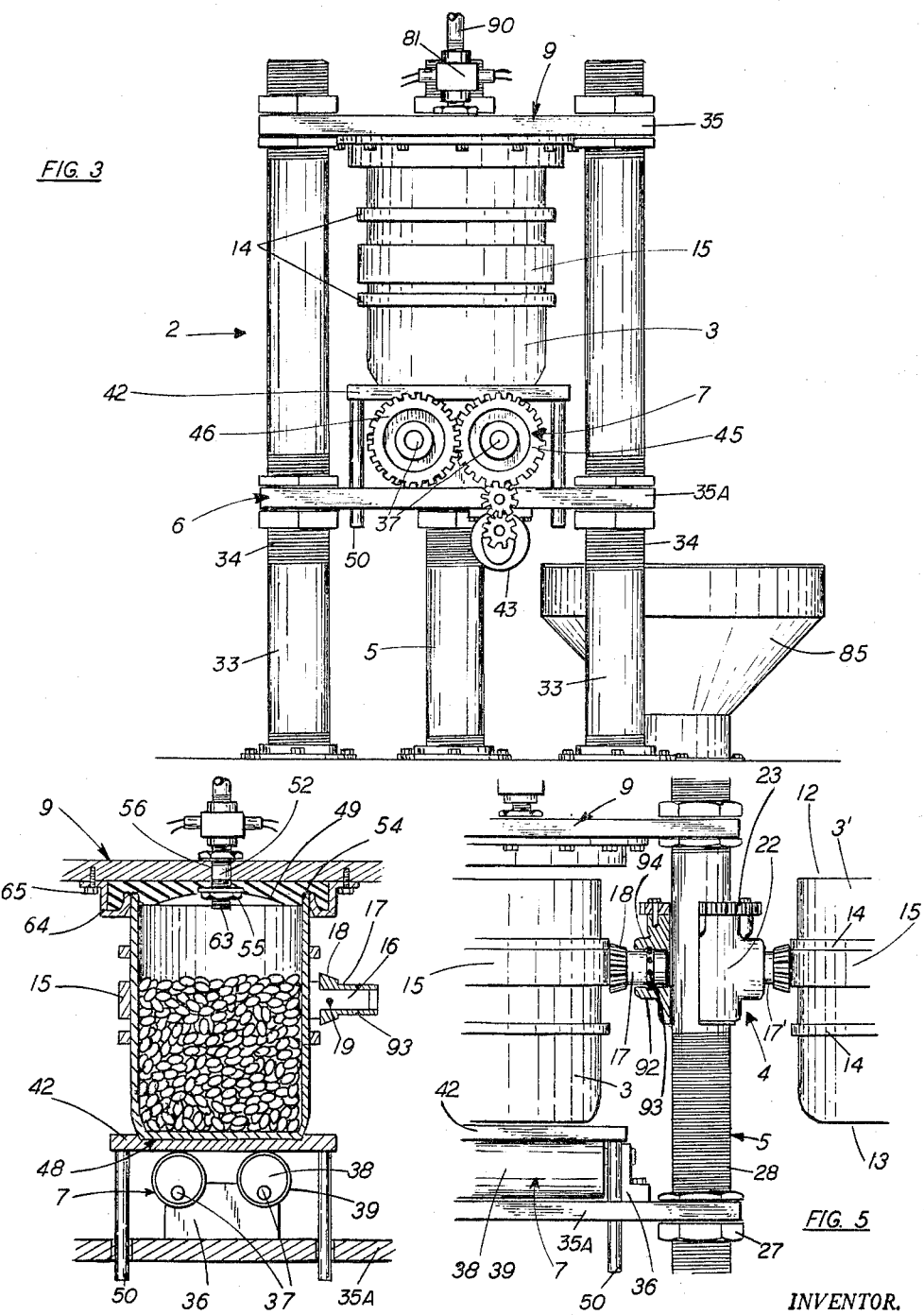

Oct. 4, 1966  V. T. CALFEE  3,276,495
APPARATUS FOR SHELLING PECANS
Filed July 30, 1959  3 Sheets-Sheet 3

INVENTOR.
VIRGIL T. CALFEE
BY
AGENT 3,276,495
APPARATUS FOR SHELLING PECANS
Virgil T. Calfee, Dallas, Tex., assignor of one percent to Thomas D. Copeland, Jr., Garland, Tex.
Filed July 30, 1959, Ser. No. 830,636
4 Claims. (Cl. 146—8)

This invention relates to apparatus for preparing edible products for human consumption and more particularly to such edible products as are raised with a hard brittle shell in contrast with those which have a soft or fibrous husk.

An object of this invention is to provide an apparatus for removing the outer brittle protective shell of an edible nut by means of unheated, dry air alone at a moderate pressure and in an extremely short period of time.

And another object is to provide an apparatus for treating edible products by pressurized air which is extremely simple in construction and yet durable and efficient in operation and requiring a minimum of maintenance.

A still further object is to provide an apparatus for treating vegetable or animal products with pressurized air on a mass product basis in which the products or the apparatus are untouched by human hands between the input of untreated products to the output of treated products.

The edible nuts mentioned above and usable in this invention may be described as the hard brittle shelled variety equivalent to pecans.

Air is given as an example of the pressurized medium or compressed gas usable in this invention; and 200 p.s.i. and 1 minute are given as examples of the moderate pressure and extremely short period of time mentioned herein.

Room temperature as used in this specification corresponds to the universally accepted definition as the ambient temperature surrounding an object located indoors.

These and other objects and advantages will be apparent from an examination of the following specification and drawings, in which:

FIG. 1 is a top plan view of one embodiment of the apparatus of this invention which is used for shelling pecans;

FIG. 2 is a side elevational view of the device of FIG. 1;

FIG. 3 is an end elevational view of the device of FIGS. 1 and 2.

FIG. 4 is a cross sectional view taken along the lines 4—4 of FIG. 1;

FIG. 5 is an enlarged fragmentary detail view of post and spider assembly of FIG. 2.

Figure 8:
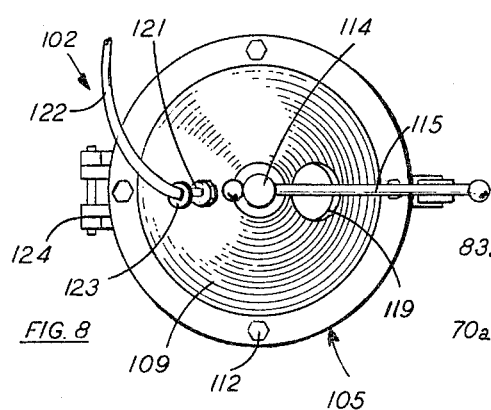
FIG. 8 is a plan view of another embodiment for carrying out the process of this invention.
Figure 11:
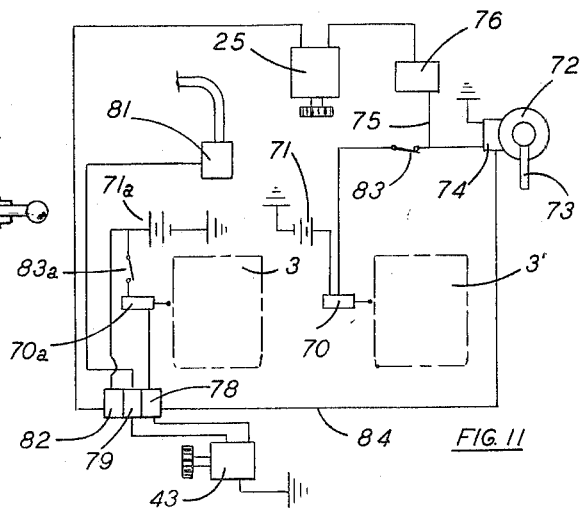
FIG. 11 is an electrical schematic diagram for use when employing the device of FIGS. 1-5 in carrying out the method of this invention.

Referring now more particularly to the characters of reference in the drawing it will be observed in FIGS. 1-3 that the complete pecan shelling apparatus of this invention, identified generally at 2, consists basically of a pair of pecan carrying containers or cups 3 slidably supported in a motor operated spider assembly 4 which is mounted for rotation on a vertical post 5 of a structural mounting assembly 6 that supports a cam operated cup lifting unit 7, a cup tilting rack 8, and a cup pressurizing platform assembly 9. The elements named cooperate to comprise the automation apparatus of this invention and by the proper settings for continuous cycling, as will be hereinafter described, this apparatus when using cups of a two gallon size will automatically shell or deshell approximately 20 bushels of pecans per hour.

The cups 3 are moderately heavy duty construction with an open slightly rounded top edge 12 and a curved solid bottom 13 and having a pair of vertically spaced rings 14 near the midpoint of the outer circumference of the cups 3.

Each cup 3 is supported for sliding vertical movement relative to spider assembly 4 in a normally horizontal positioned split ring 15 which includes a split shank 16 that is connected to hollow gear shaft 17 and its integral bevel gear 18 by pin 19 that holds bevel gear 18 in place. Gear shafts 17 and 17' are separately journalled within cross 22 so that the two cups 3 and 3' may have independent movement when inverting to discharge their load. The cross 22 is free turning relative to post 5 but is gear connected by means of annular gear 23 mounted to the top of cross 22 and drive pinion 24 mounted on the output shaft of motor 25 which is itself mounted on post 5 by means of a double ring bracket 26.

Post 5 is an integral part of the structural mounting assembly 6, and in addition to providing support for the motor 25, it also supports the bevel gear rack 8 by means of a pair of jam nuts 27 which are threaded on the long threads 28 of the post 5 until the hub 29 of the rack 8 engages the lower side of cross 22 so that the gear hub 29 is then locked in the proper angular position on post 5 by means of set screw 32. The assembly 6 also includes two other posts 33 having threaded sections 34 to permit vertical positioning of a pair of spaced parallel platforms 9 and 35.

The cam operated cup lifting unit 7 includes a pair of spaced bearing plates 36 in which are journalled a pair of parallel cam shafts 37 having lifting cams 38 rigid therewith. Closely surrounding the circumference of cams 38 there is situated a sleeve 39 which will rotate freely with the cam 38 and shaft 37 until some friction or force is applied to the circumference of the sleeve 39 at which time the sleeve will cease rotation but will act as a bushing to permit cam 38 to continue to rotate and impart vertical motion to the sleeve 39 which in turn will cause guide and life table 42 to rise or fall as dictated by the lift motor 43. Bearing plates 36 are mounted on the upper side of a lower mounting platform 35 whereas the lift motor 43 is mounted on the lower side of the platform and the cam shafts 37 are driven by the motor 43 through a drive gear train 44 including opposite rotating cam shaft gears 45 and 46. The guide and lift table 42 includes a shallow tapered recess 48 to receive and guide the bottom of the cups 3 and 3' into precision alignment with the overhead sealing gasket 49 when the cams operate to lift the table 42 and the cup 3 or 3'. The cup pressurizing platform assembly 9 includes 3 triangularly spaced posts 5 and 33 and a pair of vertically spaced platforms 35 and 35a in such a manner that when the cams 38 have moved the guide table 42 to its highest position the top edge 12 of the cup 3 will form a sealed engagement with the groove 54 of sealing gasket 49. Intermediate platform 42 is bulged slightly at 48 to seat the cup 3 when in its pressurizing position; platform 35a includes holes 47 to accommodate guide pins 50 which are rigidly attached to the underside of table 42 and which slideably pass through guide holes 47 in the lower platform 35a.

The cup pressurizing platform assembly 9 includes a vertical hole 56 extending therethrough to direct the pressurized air into the interior of the cups 3 when the latter is in its pressurizing position. A solenoid air valve 81 is threaded onto the upper end of a nipple 52. A nut and washer 55 are threaded to the nipple 52 and cover the lower end of the hole to prevent the pressurized air from entering the area between the platform 9 and the gasket 49. A corresponding nut and washer seal the top opening of hole 56, secure the desired condition and also prevent blow-by of the air around the valve nipple threads 63. The gasket 49 is held in place on the lower side of platform 9 by means of a circular clamp 64 and set screws 65.

In the production line operation which is possible with the embodiment of this invention as shown in FIGS. 1–5, one or more of the automatic pecan shelling devices 2 are installed at a location to receive whole pecans from a conveyor chute 68 or belt (not shown) and these or other conveying means will transport the pecans from a loading station or input hopper 69 into the open cup 3'. A timer relay 74 is associated with gate motor 72 so that upon receiving an electrical impulse from switch 70 the motor 72 will rotate one full turn (360°) only and then stop in its closed position. The time required for gate 73 to travel 360° of course determines the quantity of pecans which will pass through chute 68 and into cup 3'. Upon completion of the preset time interval for the loading operation, timer 74 stops the motor 72 and completes the circuit 75 through second timer 76 which closes a circuit directly from battery 71 to motor 25 which moves the spider assembly 4 one-half of a turn or 180°. At this point the cup 3 has engaged switch 70a which completes a circuit from battery 71a to a cam timer 78 which energizes cam motor 43 and rotates the cams 38 and 39 for 180° to fully lift cup 3 into its pressurizing position as shown in FIG. 4. At this point the timer no longer energizes motor 43, but engages another timer 79 which energizes solenoid valve 81 and opens the valve therein and permits pressurized air at approximately 200 p.s.i. to enter the interior of cup 3 which has now formed a pressure chamber by the engagement shown in FIG. 4. After about one minute or less, the timer 79 stops current to the spring loaded electrically released solenoid valve 81 and redirects current to cam timer 78 to lower cup 3 and also directs current to another timer 82 which operates drive motor 25 for a sufficient length of time to move cups 3 and 3' through 180° of travel. After the operation has been initially started, switch 83 may be opened, and by virtue of lead 84 from the cam timer 78 to the gate motor timer 74, the entire operation will be controlled from the microswitch 70a at the pressure station and microswitch 70 will then be inactive. As the gear 18 rotates on rack 8 the cup 3 tilts about the horizontal axis of shaft 17 and dumps its entire load of new shelled pecans into output hopper 85. From this output hopper the pecan meats and shells pass through chute 86 and into a water or pecan oil bath tank 87 wherein the hulls float on top of the bath and the nut meats drop to the bottom of the bath and land on a conveyor 88. The nut meats are usually whole or in halves and they are then conveyed up and out of the bath by the conveyor and dumped over the side of tank 87 and onto another conveyor 89 which transports the nut meats to the conventional packaging machinery (not shown). A baffle 98 is installed in the tank 87 so that the hulls which are floating will not get onto the conveyor 88 which lifts the nut meats out of the bath. It will be observed that from the time the pecans are loaded into the input hopper 69 until the shelled nuts are packaged into bags they are not touched by human hands. This method will therefore have the obvious advantage of a higher degree of sanitation than is believed presently possible in the industry. The separation bath may be a dilute solution of pecan or other vegetable oil to overcome the disadvantage that water might have in removing some of the natural oil from the nut meat. The normally closed switch 83a may be manually opened whenever it is desired to stop the automatic operation.

The bearing balls 92 to permit the cups 3 to tip are installed in a race comprised of one race half 93 on the bevel gear shaft 17 and the other race half 94 in the cross 22 by dropping them individually through a small hole in the cross 22 and then resealing the hole so that it does not show.

Figure 9:
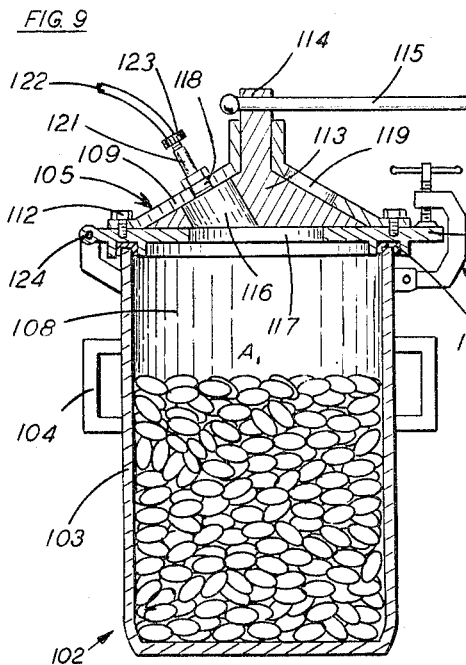
FIG. 9 is a side elevational view partly in cross section of the device of FIG. 8 in its initial or loaded condition.
Figure 10:
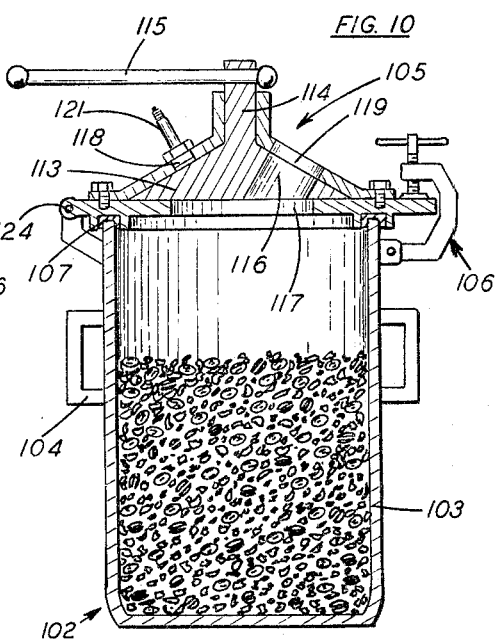
FIG. 10 is a view corresponding to FIG. 9 but after the shell removing step of the method of this invention has been completed.

In the embodiment shown in FIGS. 8–10 the method of this invention may be practiced by a simple hand operated instrumentality and this device will have appeal and utility to housewives or restaurant operators who would not require a large automatic apparatus as shown in the embodiment of FIGS. 1–5.

Figure 6:
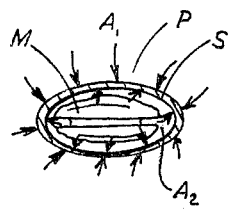
FIG. 6 is a pressure diagram showing the forces applied externally to a pecan to be shelled in carrying out the process of this invention.
Figure 7:
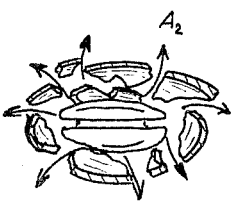
FIG. 7 is a diagrammatic view showing the reaction of the elements of FIG. 6 when the externally applied forces are suddenly released.

Both of these embodiments operate on the same basic principle which may be shown by reference to FIGS. 6 and 7. In FIG. 6 a pecan P is seen to have a hard smooth outer shell S which rather loosely encloses a nut meat M. Certain thin fibrous matter is also present inside the shell S, but in this diagrammatic illustration this structural part is not shown since it might obscure the main operation. As the air which is external to the hard but porous shell S builds up pressure as shown by the arrows $A_1$ this pressure penetrates the porous shell and builds up an equal and opposite pressure $A_2$ on the inside of the shell. Then at the instant this external pressure $A_2$ is released as by a quick opening valve, the internal pressure $A_2$ now exceeds the external pressure by a sufficient amount to erupt the shell S in a manner similar to an internal explosion and the shell fragments fly outward as shown in FIG. 7. This is due to the fact that the pressure was rather gradually applied to build up the pressure $A_1$ and $A_2$ but the release is so sudden that the now higher pressure $A_2$ cannot pass through the very minute pores in the shell S and in order to equalize to the outside pressure it breaks the shell.

The embodiment identified at 102 in FIGS. 8–10 is seen to include a hollow cup 103 having two or more carrying handles 104 and having a hinged cover assembly 105 which is latched into its pressure-tight operational position by hand operated clamp 106. The cup 103 includes a slightly rounded top edge which engages a rubber gasket 107 of cover assembly 105 when the latter is closed to provide a sealed inner chamber 108 for the pressurized shelling operation hereinbefore discussed. The complete cover assembly 105 includes a conical cover 109 bolted to a flat gasket ring 111 by capscrews 112 to form an internal working area that is occupied by a cone valve 113 which is preferably made of a bushing material which does not require oil and forms an air tight seal. "Oilite" bronze, nylon, Teflon, graphite and lignum vital wood are among the materials which could be used for this cone valve 113. A vertical neck 114 extends vertically from the top of valve 113 and is drilled to receive a turning handle 115. Valve 113 includes only one channel 116 which has an upper and lower opening, but this channel is angularly inclined in such a manner that the lower opening always coincides with the large central opening 117 in the gasket plate 111 and the upper opening coincides with the pressure port 118 at one position of the handle 115 and coincides with the large exhaust port 119 at a second position of the handle which is 180° from the first position. A conventional tire valve 121 is threaded into the pressure port 118 and an ordinary hand tire pump may be connected to this valve as indicated by hose 122 and adapter 123. The cover assembly 105 being hinged at 124 may be raised to receive a load of pecans to be shelled. Upon closing the cover the cup 103 and gasket 107 engage to form a pressure tight chamber 108 and clamp 106 locks the cover assembly in place. Pressurized air is then introduced through the hand pump hose 122 and allowed to remain in the chamber for about one minute (FIG. 9). The valve 113 is then quickly rotated by handle 115 to a full 180° position (FIG. 10) at which time the pressure port 118 is closed and the exhaust port 119 is fully opened by the channel 116 so that the chamber pressure $A_1$ is quickly released. This causes the internal pressure $A_2$ of the pecans to explode the shells of each pecan in cup 103 in the manner described with reference to FIG. 7.

From the foregoing description it will be readily seen that there has been produced a disclosure as substantially fulfills the objects of this invention as set forth herein.

While this specification sets forth in detail the present and preferred construction of this invention, still in practice such deviations from such detail may be resorted to as do not form a departure from the spirit of the invention as defined in the appended claims.

Having thus described the invention, what is claimed as new and useful and is desired to be secured by Letters Patent is:

1. An automation apparatus for removing the hard brittle external shell of pecans at ordinary room temperature to expose the inner nut meat, comprising: a supporting means, a pressurizing platform assembly on said supporting means, a pecan carrying container adapted to move into engagement with said platform assembly in pressure tight relation thereto and thereby form a sealed interior to said container, means to apply compressed air to the interior of said container gradually for a sufficient time to penetrate to the interior of said shell and in a sufficient amount to explode said shell when the external pressure at said shell is suddenly reduced to atmospheric, and means to rapidly move said container away from its pressure tight engagement with said platform and release the interior pressure, and means to shut off the application of said compressed air prior to the removal of said container.

2. An automation apparatus for removing the hard brittle outer shell of pecans at ordinary room temperature to expose the inner nut meat comprising: a supporting means, a pressurizing platform assembly on said supporting means, a pecan carrying container adapted to move into engagement with said platform assembly in pressure tight relation thereto and thereby form a sealed interior to said container, solenoid valve means to apply compressed air to the interior of said container gradually for a sufficient time to penetrate to the interior of said shell and in a sufficient amount to explode said shell when the external pressure at said shell is suddenly reduced to atmospheric, and cam means to rapidly move said container away from its pressure tight engagement with said platform and release the interior pressure, and means to shut off the application of said compressed air prior to the removal of said container.

3. An apparatus for removing the hard brittle external shell of pecans at ordinary room temperature to expose the inner nut meat in a usable condition, comprising: a supporting means, a pressurizing platform assembly on said supporting means, a pecan carrying container adapted to engage said platform assembly in pressure tight relation thereto, means to apply compressed air to the interior of said container gradually for a sufficient time to penetrate to the interior of said shell and in a sufficient amount to explode said shell when the external pressure at said shell is suddenly reduced to atmospheric, and means to rapidly remove said container from its pressure tight engagement, and means to shut off the application of said compressed air prior to the removal of said container, and power means adapted to move said container laterally relative to said platform until a predetermined position from which pressure engagement with said platform assembly may be attained is reached.

4. An automation apparatus for removing the hard brittle outer shell of pecans at ordinary room temperature to expose the inner nut meat comprising a supporting means, a pecan loading means, a pressure platform assembly on said supporting means, a plurality of normally open top pecan carrying containers adapted to revolve in said supporting means, means to move at least one of said containers into pressure tight closed top engagement with said platform assembly at a time when at least one other container has its open top in alignment with said loading means, and means to gradually supply compressed air to the interior of said closed container for a sufficient time to penetrate the interior of said shell in sufficient amount to explode said shell when the external pressure at said shell is suddenly reduced to atmospheric, and means to rapidly remove said one container from its pressure tight engagement and reduce the pressure therein to atmospheric, and means to revolve said containers after said rapid removal and place a second pecan carrying container into a position for pressure tight engagement with said platform assembly, and automatic means to remove the contents of said one container.

References Cited by the Examiner
UNITED STATES PATENTS

| | | | |
|---|---|---|---|
| 1,433,928 | 10/1922 | Baxter | 146—223 X |
| 1,445,742 | 2/1923 | Blair | 146—223 |
| 2,248,367 | 7/1941 | Low | 146—223 |
| 2,278,463 | 4/1942 | Musher | 99—204 |
| 2,278,467 | 4/1942 | Musher | 99—126 |
| 2,278,476 | 4/1942 | Musher | 99—107 |
| 2,422,893 | 6/1947 | Forkner et al. | 99—125 |
| 2,429,785 | 10/1947 | Winters | 146—223 X |
| 2,547,234 | 4/1951 | Spang | 17—26 |
| 2,559,270 | 7/1951 | Abbott | 17—25 |
| 2,806,501 | 9/1957 | Van Dijk | 99—126 |

ROBERT C. RIORDON, *Primary Examiner.*

A. H. WINKELSTEIN, J. S. OVERHOLSER, *Examiners.*

H. LORD, W. G. ABERCROMBIE, *Assistant Examiners.*